US005313786A

United States Patent [19]

Chlus et al.

[11] Patent Number: 5,313,786

[45] Date of Patent: May 24, 1994

[54] GAS TURBINE BLADE DAMPER

[75] Inventors: Wieslaw A. Chlus, Wethersfield; Michael Gonsor, Hebron; David P. Houston; Paul D. Kudra, both of Glastonbury, all of Conn.

[73] Assignee: United Technologies Corporation, Hartford, Conn.

[21] Appl. No.: 980,085

[22] Filed: Nov. 24, 1992

[51] Int. Cl.[5] .......... F02C 3/00

[52] U.S. Cl. .......... 60/39.75; 415/119; 416/193 A; 416/500

[58] Field of Search .......... 60/39.31, 39.75; 415/119; 416/193 A, 500

[56] References Cited

U.S. PATENT DOCUMENTS

| | | | |
|---|---|---|---|
| 3,112,915 | 12/1963 | Morris | 253/77 |
| 3,266,771 | 8/1966 | Morley | 416/193 A |
| 3,610,778 | 10/1971 | Suter | 416/210 |
| 3,666,376 | 5/1972 | Damlis | 416/500 |
| 3,751,183 | 8/1973 | Nichols et al. | 416/220 |
| 3,923,420 | 12/1975 | Chifos | 416/500 |
| 3,986,792 | 10/1976 | Warner | 416/500 |
| 4,011,718 | 3/1977 | Asplund | 60/39.31 |
| 4,182,598 | 1/1980 | Nelson | 416/500 |
| 4,455,122 | 1/1984 | Schwarzmann et al. | 416/500 |
| 4,457,668 | 7/1984 | Hallinger | 416/95 |
| 4,480,959 | 11/1984 | Bourguignon et al. | 416/500 |
| 4,568,247 | 2/1986 | Jones et al. | 416/193 A |
| 5,052,890 | 10/1991 | Roberts | 416/193 A |
| 5,205,713 | 4/1993 | Szpunar et al. | 416/193 A |

FOREIGN PATENT DOCUMENTS

| | | | |
|---|---|---|---|
| 0660207 | 3/1987 | Switzerland | 416/193A |
| 1457417 | 12/1976 | United Kingdom | 416/193A |
| 2112466 | 7/1983 | United Kingdom | 416/193A |

*Primary Examiner*—Richard A. Bertsch
*Assistant Examiner*—Howard R. Richman
*Attorney, Agent, or Firm*—Edward L. Kochey, Jr.

[57] ABSTRACT

An integrated damper and windage cover 52 has a windage cover portion 56 cantilevered at the upstream end, free of contact with the blade platform 24, 32. The contact portion 54 is rigid and bears against the underside of the blade platform 24, spanning blade platform clearance 50.

7 Claims, 3 Drawing Sheets fig.3
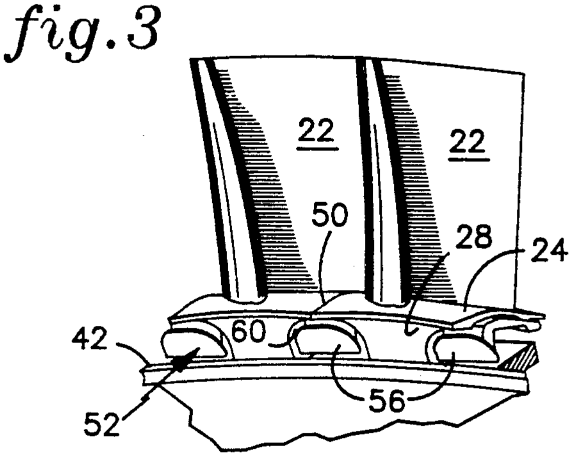
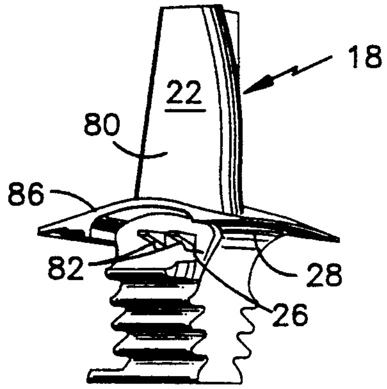
fig.6
fig.4
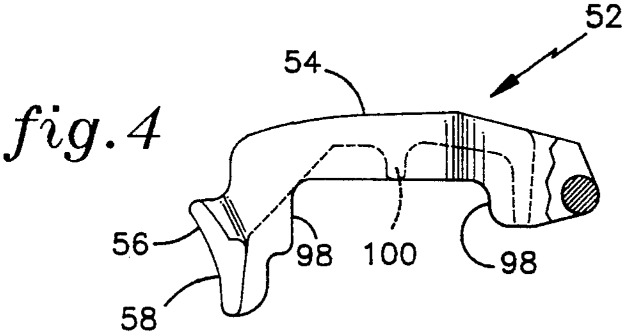
fig.5
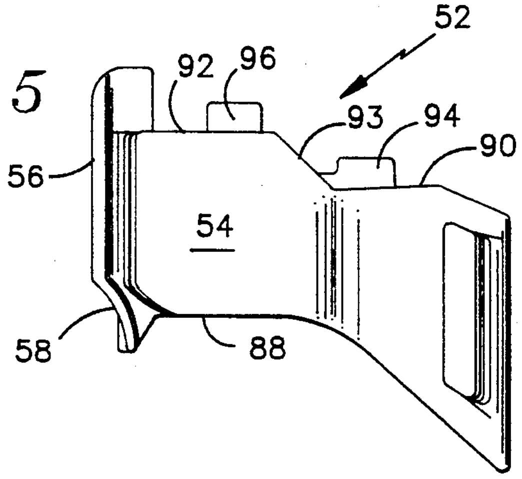

GAS TURBINE BLADE DAMPER

TECHNICAL FIELD

The invention relates to gas turbine engines and in particular to damping of turbine blades and reducing windage loss.

BACKGROUND OF THE INVENTION

In a gas turbine engine airfoil blades are secured to a turbine disk and driven by hot high pressure gas. The blades are airfoils with a neck connecting each airfoil to a root securing the blade to the disk. This root is often of the dove-tail type sliding into the disk axially or obliquely to the axis.

At the base of each airfoil and above the neck is a blade platform. In high temperature turbines this is frequently segmented with each blade being independent of the adjacent blade. The blades are therefore susceptible to vibration which can lead to a high level of repeated stress. Damping of the vibration of each blade is required to avoid these high levels of repeated stress.

The blades operate with high forces and at high temperatures, approaching the limits of the material. The blades accordingly are cooled with lower temperature air and the particular loading on the blade is a concern.

The turbines operate at high rotational&p such as 15,000 rpm which leads to a high centrifugal force in the order of 70,000 G. This produces a high load on the root and also high loading in the disk. Therefore the weight of the components secured to the disk is of concern, not only as to total engine weight but also as to the disk loading caused by the rotational forces. The high disk loading leads to larger disk and even more engine weight.

Windage losses occurring in the rotating components leads to decreased performance and heating of the cooling air. It is desirable to reduce these losses.

SUMMARY OF THE INVENTION

A gas turbine has a disk carrying a plurality of blades. An upstream rotor seal and a downstream rotor seal block a portion of the cooling flow which would otherwise pass beneath the blades. The blade has an airfoil and a blade platform thereunder. The neck under the platform is substantially of the shape of a continuation of the airfoil carries the load down to the root.

The platform of each blade has a cantilevered upstream portion which is subjected to high centrifugal loading and has under the platform a radiused filet fairing into the neck. The platform has a side edge on the concave side of the blade and a side edge on the convex side of the blade, these being parallel to each other. An integrated damper and windage cover is located under these platforms.

The elongated damper has a contact portion and a windage cover portion. The contact portion contacts the underside of two adjacent blade platforms. The windage cover is cantilevered from the upstream end of the contact portion. It is shaped with the same curvature as the underblade filet and located with the surface in alignment with the underblade filet. The windage cover is also located so as to be free of contact with the blade platform thereby avoiding placing any load on the cantilevered portion.

BRIEF DESCRIPTION OF THE FIGURES

FIG. 3 is a front view of the damper in place;
FIG. 4 is a side view of the damper;
FIG. 5 is a top view of the damper;
FIG. 6 shows the convex side of the blade.

DESCRIPTION OF THE PREFERRED EMBODIMENT

Figure 1:
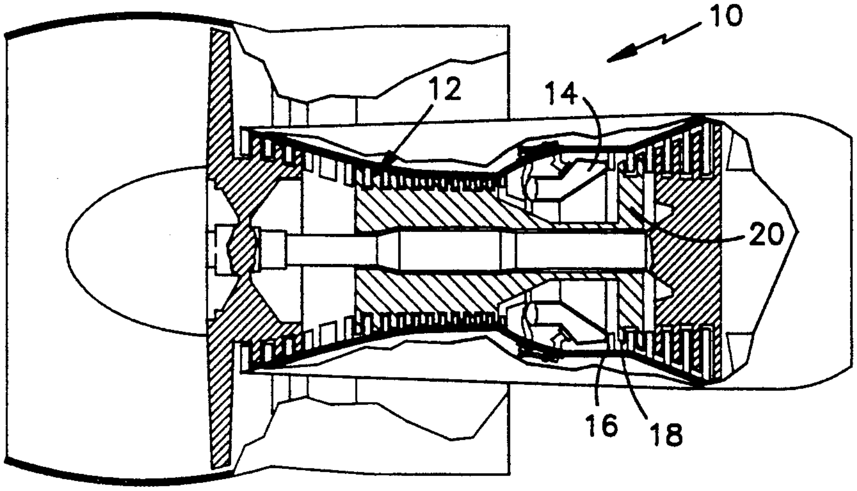
FIG. 1 is a view of a gas turbine engine.
Figure 2:
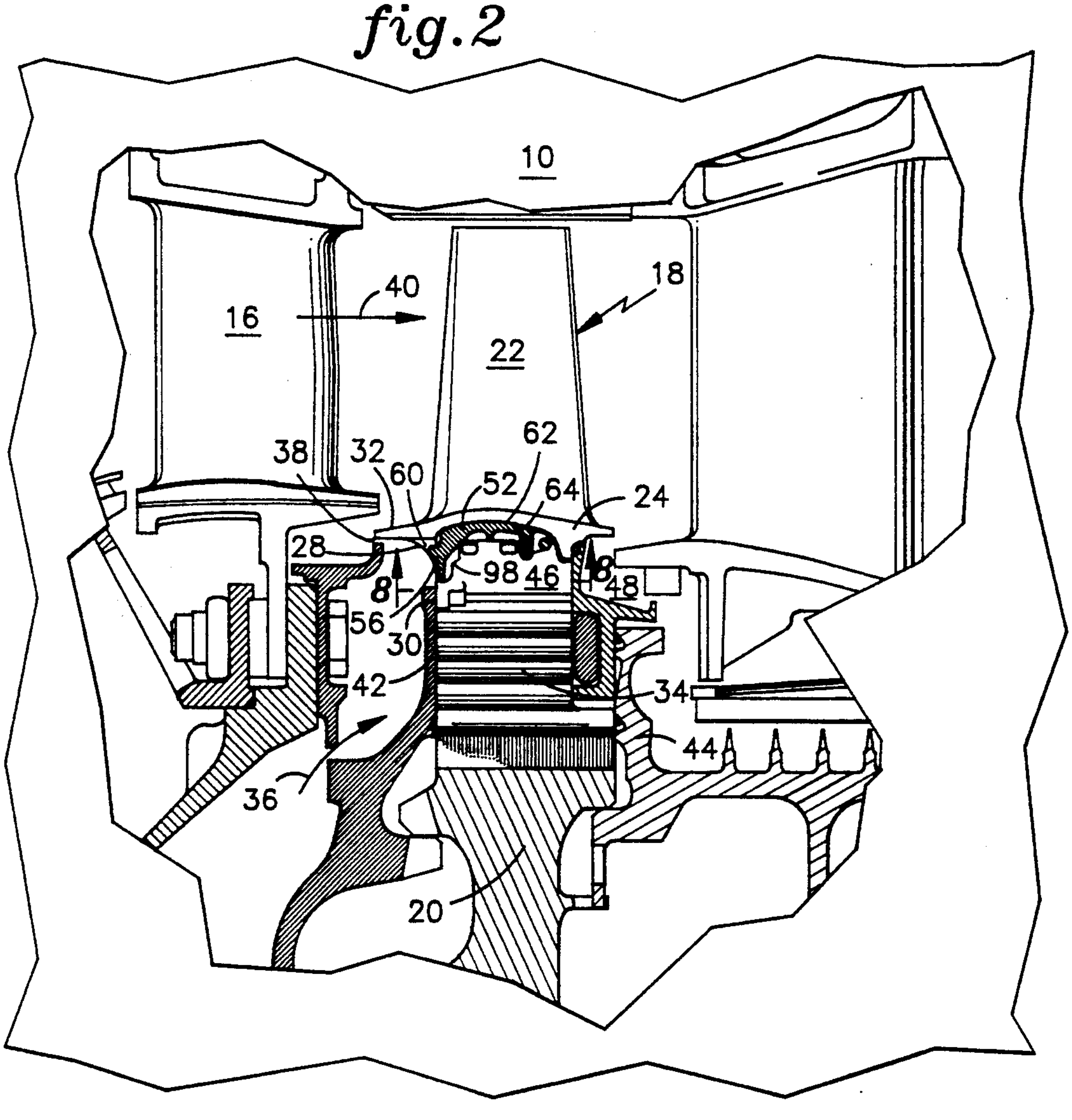
FIG. 2 is a side section of the damper in place.

In FIG. 1 there is illustrated a gas turbine 10, rear compressor 12 delivers air at high pressure to combustor 14. The combustion gasses at high pressure pass through vanes 16 driving blades 18 which are secured to disk 20. Referring to FIG. 2 it can be seen that blade 18 includes an airfoil 22 with a blade platform 24 thereunder. A neck 26 is located below the platform. This is substantially an extension of the airfoil shape to provide an appropriate load path through the neck. An upstream underplatform filet 28 of a generous radius is located to fair into the face 30 of the neck. This provides an appropriate load path to transfer the high centrifugal loading of the cantilevered upstream portion 32 of platform 24. Below the neck is root 34 of a dovetail form which is secured to corresponding dovetail openings in disk 20.

A flow of cooling air 36 is supplied from the compressor discharge with a portion of this flow passing through opening 38 to prevent ingestion of hot gas from the gas flow 40. An upstream rotor seal 42 and a downstream rotor seal 44 block any flow of cooling air through the blade connection area in the root portion 34 of the blades. It can be seen that an opening exists between adjacent blades between filets 28 into the underblade zone 46 beneath the blade platforms of adjacent blades. The downstream rotor seal 44 operates to prevent the flow of this cooling air to the downstream volume 48. Potential leakage of this air may occur between adjacent blade platforms through clearance 50 (FIG. 3).

In some cases, seals are applied to prevent air flow through the clearance or opening 50. Here it is desirable that the upstream section of this opening be restricted but not completely sealed. It is desirable to have sufficient cooling air flow to cool the platform, while excess flow would result in an efficiency loss. The cooling air pressure is pegged to the gas stream pressure by the pressure difference through opening 38. Little pressure difference exists between zone 46 and the gas stream. A tight seal at this upstream end is not desirable, so that blade platform cooling air may pass.

Underblade damper 52 is shown alone in FIGS. 4 and 5 and as installed in FIGS. 2 and 3. The damper has a contact portion 54 and a windage cover portion 56. The contact portion is designed to establish line contact with the bottom surface of the platform. Because of the damnina function and limited sealing requirement, this contact portion should be rigid as compared to a usual seal.

The windage cover portion 56 is cantilevered from the upstream end of the contact portion 54. It is shaped with filet 58 having a curvature which is the same curvature as the underblade filet 28. It is located between the adjacent blades with the cover portion surface defined by filet 58 substantially in alignment with the surface of the underplatform filet 28 of adjacent blades. In the installed position this windage cover portion 56 is free of contact with platform 24 and specifically the cantilevered portion 32 thereof. The maintenance of this free space 60 avoids any possibility of loading of the already high loaded cantilevered portion 32 by the vibration damper.

The contact portion of each damper has a damping surface 62 which is arcuate and conforming to the underplatform surface 64 of the blade. This is located to rub against two adjacent blade platforms. With the engine rotating at 15,000 rpm and the mass of the damper being 4.7 gms, a force of 3150 newtons is exerted against the underside of the adjacent dampers. If the damper has insufficient weight it will not create enough friction to damp the blades. If it has too much weight it will lock up on one or the other, or possibly both platforms and therefore be ineffective.

With the windage cover portion 56 being free of the platform itself, the weight of this portion is included in the total weight of the damper operating under the platform. Since a given weight is required to perform the damping operation, the weight of the windage cover 56 is included and no penalty is suffered for the additional weight of this windage cover.

Figure 7:
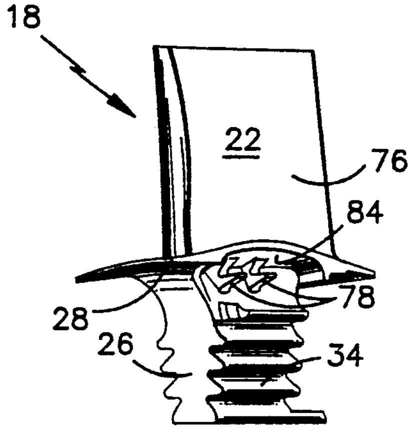
FIG. 7 shows a concave side of the blade.

FIG. 7 shows the concave side 76 of the blade 18. Since the high load from the airfoil 22 must be transmitted to the root 34, the neck 26 of the blade is substantially a continuation of the airfoil shape of the airfoil. Circumferentially extending blade tabs 78 are provided on the root for location and retention of vibration damper 52. FIG. 6 illustrates the convex side 80 of blade 18. The neck 26 carries blade tabs 82 for retention of the vibration damper.

The concave side of the blade shown in FIG. 7 has a concave blade side platform edge 84 while in FIG. 6 the convex blade side of the blade has a convex side platform edge 86.

Referring to FIG. 5 which shows a top view of the vibration damper 52, the contact portion 54 of the damper has a side edge 88 of concave shape substantially fitting the convex portion of neck 26 of a blade. The other side of the damper has a first step 90 and a second step 92 with a sloped portion 93 therebetween. Radially extending tabs 94 and 96 are located on these steps for the purpose of positioning the damper circumferentially, and for preventing contact between the windage cover portion and the blade.

Figure 8:
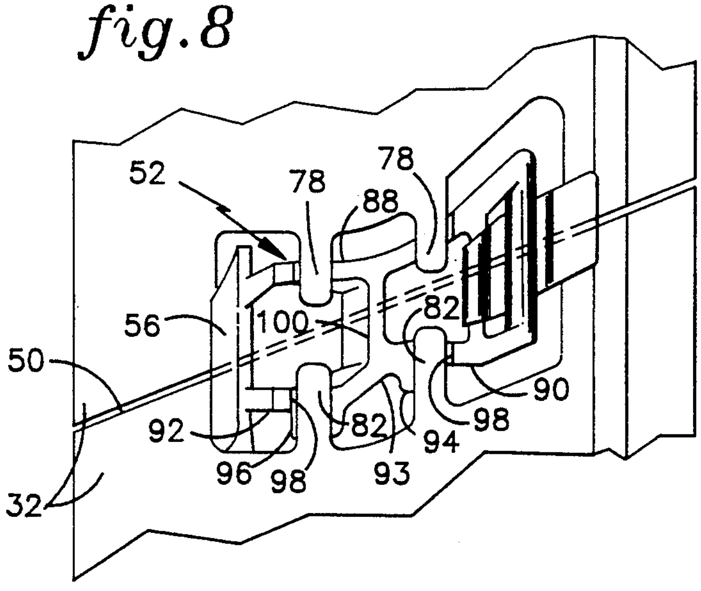
FIG. 8 is a bottom view showing the damper in place.

FIG. 8 illustrates the location of underblade damper 52 with respect to an opening 50. As best seen in FIG. 4, the contact portion has two radially extending abutments 98. These abut circumferentially extending tabs 78 or 82 on the blade neck. This retains the damper in its axial position.

Stiffening rib 100 extends between the sides of the damper near the midpoint. Adequate stiffness of the damper is achieved without excessive mass.

What is claimed is:

1. A gas turbine engine having an axis, an upstream direction, a downstream direction, a disk, and a plurality of blades;
   each blade having a airfoil, a blade platform, a neck a root, and each blade platform having an underside;
   the root of each blade secured in said disk;
   the neck of each blade having a cross-sectional area substantially a continuation in the shape of the airfoil;
   the platform of each blade having a cantilevered upstream portion with a radius underblade filet having a surface thereunder fairing into the neck, and having a concave blade side platform edge and a convex blade side platform edge parallel to each other;
   an integrated damper and windage cover comprising:
   an elongated damper having a contact portion and a windage cover portion having a surface;
   said contact portion contacting the underside of two adjacent blade platforms;
   said windage cover portion cantilevered from an upstream end of said contact portion, shaped with the same curvature as said underblade filet, located between adjacent blades with the windage cover portion surface in alignment with the surface of said underblade filet on adjacent blades, and with said windage cover portion free of contact with said platforms.

2. An integrated damper and windage cover as in claim 1, further comprising:
   said plurality of blades arranged circumferentially on said disk, and having a radial direction from the center of said disk through each blade;
   said neck of each blade having circumferentially extending tabs; and
   said contact portion having two radially extending abutments on at least one side, contactable with said tabs for axially retaining said damper.

3. An integrated damper and windage cover as in claim 2, further comprising:
   said contact portion having two radially extending abutments on each side, contactable with said tabs for axially retaining said damper.

4. An integrated damper and windage cover as in claim 1, further comprising:
   the neck of each blade having a concave side and a convex side; and
   said contact portion having a side edge of concave shape substantially fitting the convex side of said neck, whereby said damper may nest closely thereto.

5. An integrated damper and windage cover as in claim 1, further comprising:
   the neck of each blade having a concave side and a convex side; and
   said contact portion on the side adjacent the concave side of said neck having two substantially axially extending steps with a sloped portion therebetween.

6. An integrated damper and windage cover as in claim 5, further comprising:
   a radially extending tab on each step.

7. An integrated damper and windage cover as in claim 1, further comprising:
   said elongated damper having first and second sides extending in a direction parallel to said side edges of said platform, and having a midpoint at the middle of the axial length of said damper;
   said damper having a stiffening rib extending between said first and second sides of said damper near the midpoint thereof.

* * * * *

UNITED STATES PATENT AND TRADEMARK OFFICE
CERTIFICATE OF CORRECTION

PATENT NO. : 5,313,786

DATED : May 24, 1994

INVENTOR(S) : Wieslaw A. Chlus, Michael Gonsor, David P. Houston, Paul D. Kudra It is certified that error appears in the above-identified patent and that said Letters Patent is hereby corrected as shown below:

Column 2, line 59-60 "dammina" should be "damping".

Signed and Sealed this

Seventh Day of November, 1995

Attest:

BRUCE LEHMAN

*Attesting Officer* — *Commissioner of Patents and Trademarks*